United States Patent [19]

Kurihara

[11] Patent Number: 5,423,049
[45] Date of Patent: Jun. 6, 1995

[54] MULTIPROCESSOR CIRCUIT

[75] Inventor: Nobumasa Kurihara, Tokyo, Japan

[73] Assignee: NEC Corporation, Japan

[21] Appl. No.: 166,615

[22] Filed: Dec. 14, 1993

Related U.S. Application Data

[63] Continuation of Ser. No. 830,305, Jan. 31, 1992, abandoned.

[30] Foreign Application Priority Data

Jan. 31, 1991 [JP] Japan .................. 3-032150

[51] Int. Cl.6 .............................. G06F 13/26
[52] U.S. Cl. ........................... 395/725; 364/DIG. 1;
  364/229; 364/229.2; 364/230.2; 364/230.3
[58] Field of Search ................... 395/725, 275, 325

[56] References Cited

U.S. PATENT DOCUMENTS

| | | | |
|---|---|---|---|
| 3,665,404 | 4/1970 | Werner | 395/725 |
| 4,099,255 | 7/1978 | Stanley et al. | 395/725 |
| 4,816,990 | 5/1989 | Williams | 395/725 |
| 4,930,070 | 5/1990 | Yonekura et al. | 395/725 |
| 4,935,894 | 6/1990 | Ternes et al. | 395/325 |
| 5,031,089 | 7/1991 | Liu et al. | 395/725 |
| 5,099,414 | 3/1992 | Cole et al. | 395/200 |
| 5,125,093 | 6/1992 | McFarland | 395/725 |
| 5,179,707 | 1/1993 | Piepho | 395/725 |

Primary Examiner—Jack B. Harvey
Assistant Examiner—Ayaz R. Sheikh
Attorney, Agent, or Firm—Ostrolenk, Faber, Gerb & Soffen

[57] ABSTRACT

This multiprocessor circuit has interruption restriction circuits connected between the interruption line, which is provided for inputting interruption signals, and each of the CPUs connected in parallel. The interruption restriction circuits restrict the input of interruption signals to each CPU under certain conditions. Each interruption restriction circuit counts the number of interruption signals received by each corresponding CPU during a specified period set at the timer, using a counter. When the count for a CPU exceeds the predetermined value, the multiprocessor circuit causes the input disabling means to disable the input of interruption signals to that CPU for a certain period of time and thereby distributes the interruption signals to a plurality of CPUs more equally.

11 Claims, 5 Drawing Sheets

MULTIPROCESSOR CIRCUIT

This is a continuation of application Ser. No. 07/830,305filed on Jan. 31, 1992, now abandoned.

BACKGROUNDS OF THE INVENTION

1. Field of the Invention

This invention relates to a multiprocessor circuit provided with a plurality of CPUs, and particularly relates to a multiprocessor circuit intended for improvement of throughput by controlling input of interruption (interrupt) signals to each CPU.

2. Description of the Prior Art

A conventional multiprocessor circuit provided with a plurality of CPUs has its CPUs connected in parallel in relation to the interruption signal line for inputting interruption signals. It receives interruption signals input from the interruption line with one of the CPUs for processing.

In such a multiprocessor circuit with the configuration described above, there is no clear rule for distribution of interruption signals among CPUs. Therefore, a particular CPU sometimes receives a much larger number of interruption signals and is placed under much heavier load than others.

This prolongs the processing time of such a CPU and results in lower throughput of the whole multiprocessor circuit.

SUMMARY OF THE INVENTION

The object of this invention is to distribute the interruption signals equally to all CPUs. In other words, the object is to prevent the interruption signals from being concentrated on to a particular CPU, thereby improving the throughput of the whole multiprocessor circuit.

A multiprocessor circuit according to a preferred embodiment of the present invention for attaining the above object has a plurality of CPUs connected in parallel in relation to the interruption line for inputting interruption signals, and interruption restriction circuits connected between the above interruption line and each CPU. Each interruption restriction circuit disables input of interruption signals to the corresponding CPU for a certain period of time when that CPU has received more interruption signals than a specified number during a predetermined time period.

According to a preferred embodiment, the above interruption restriction circuit comprises counter means to count the number of interruption signals received by the corresponding CPU, timer means to keep time for counting by the counter means, and input disabling means to prohibit input of interruption signals to that CPU for a certain period of time.

According to a further preferred embodiment, the input disabling means comprises a delay circuit to hold the input of interruption signals from the interruption line for a certain period of time and a switching circuit to switch the connection from the above interruption line to the above delay circuit when the value counted by the above counter means exceeds the specified value. These delay and switching circuits may be replaced with a keying circuit to turn on and off the input from the interruption line.

According to a still further preferred embodiment, the interruption restriction circuit above comprises counter means to count the number of interruption signals received by the corresponding CPU, input disabling means to disable input of interruption signals to that CPU for a certain period of time when the value counted by the counter reaches a predetermined value, and timer means to keep time of counting by the counter means and disabling by the input disabling means.

A multiprocessor circuit according to another preferred embodiment of the present invention comprises a plurality of CPUs connected in parallel in relation to the interruption line for inputting interruption signals, and interruption restriction circuits connected between the above interruption line and each of the CPUs. The interruption restriction circuit above comprises counter means to count the number of interruption signals received by each CPU, timer means to keep time for counting by the counter means and input disabling means to disable the input of interruption signals to the applicable CPU for a certain period of time, the input disabling means being provided with a switching circuit to switch the connection from the interruption line directly to the CPU or to the delay circuit to hold the input of interruption signals for a certain period of time. The switching circuit is designed to switch the connection from the interruption line to the delay circuit when the value given by the counter means exceeds a fixed number.

Other objects and effects of the present invention will be clarified in the detailed description below.

DESCRIPTION OF THE PREFERRED EMBODIMENTS

Preferred embodiments of the present invention will be described below referring to FIGS. 1 to 6.

Figure 1:
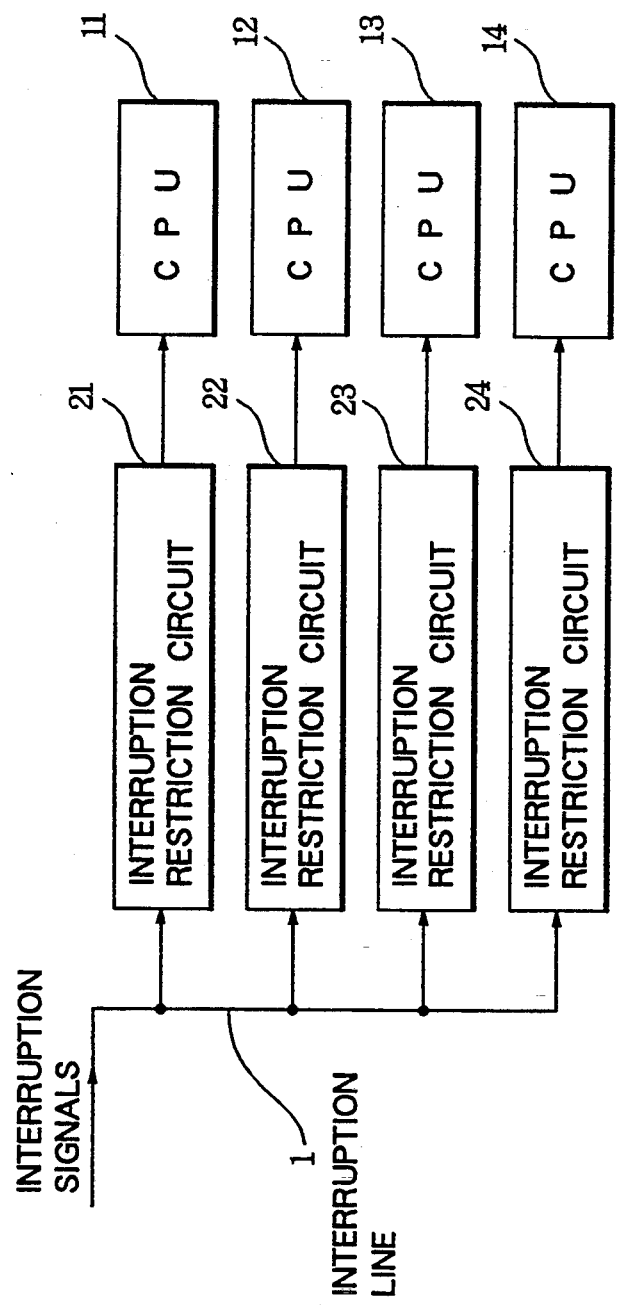
FIG. 1 is a block diagram to show the configuration of a multiprocessor circuit according to a first embodiment of the present invention.
Figure 2:
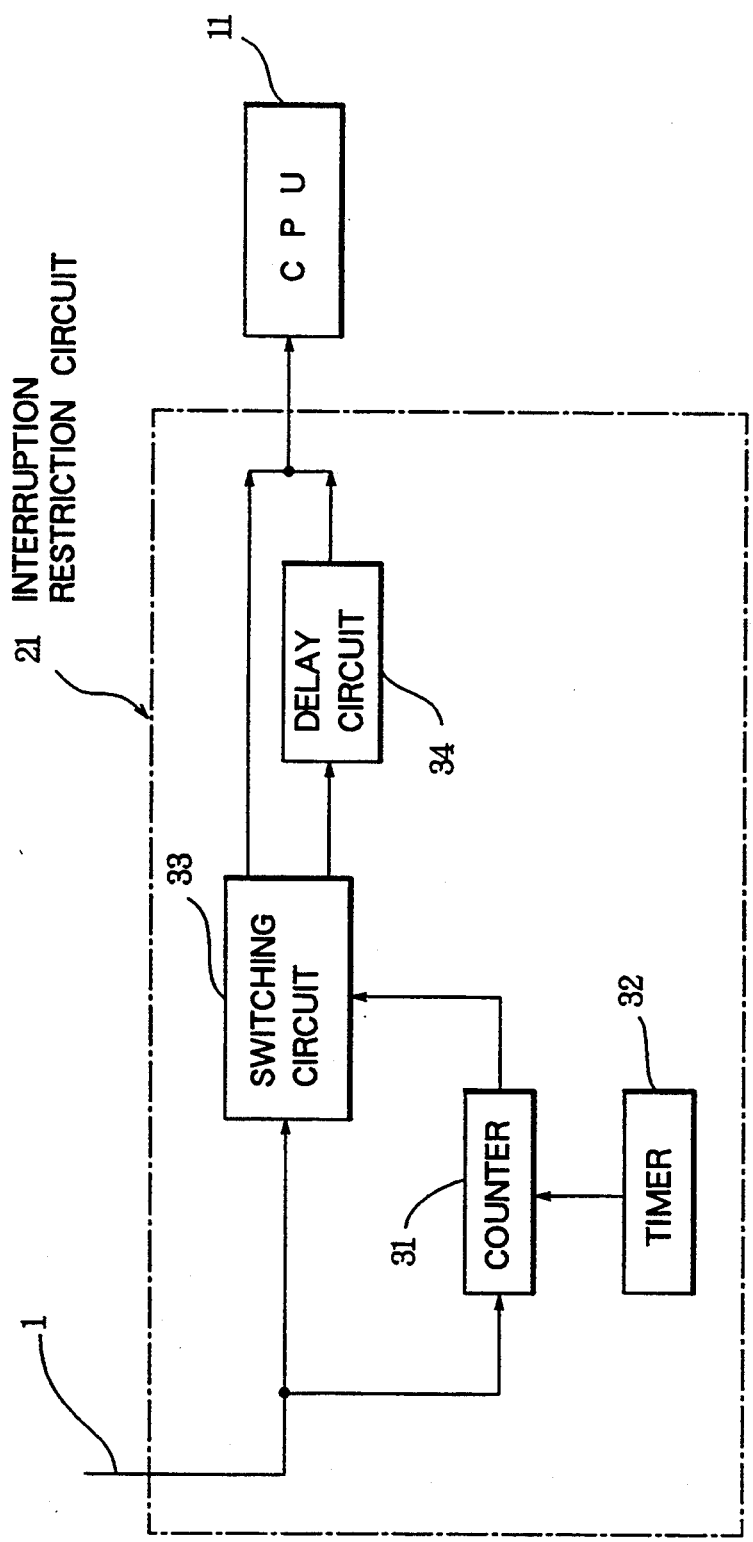
FIG. 2 is a block diagram to show the internal configuration of an interruption restriction circuit in the multiprocessor circuit according to the first embodiment.

FIG. 1 shows the configuration of a multiprocessor circuit according to a first embodiment of the present invention. In FIG. 1, the multiprocessor circuit according to this embodiment has four CPUs (Central Processing Units) 11 to 14 connected in parallel, and the interruption line 1 for inputting interruption signals to the CPUs 11 to 14 via respective interruption restriction circuits 21 to 24 connected to the input sides of the CPUs 11 to 14. FIG. 2 shows the configuration of these interruption restriction circuits 21 to 24. Since the interruption restriction circuits 21 to 24 have the same configuration, the interruption restriction circuit 21 is illustrated here as a representative.

The interruption restriction circuit 21 has a counter 31 to count the number of received interruption signals, a timer 32 to keep time for counting by the counter 3, a switching circuit 33 to switch the connection according to the counting result at the counter 31 and a delay circuit 34 to hold the input of interruption signals for a certain period of time. The switching circuit 33 may be connected to CPU 11 via a signal line 36 or a delay circuit 34. The switching circuit 33 selects either the signal line 36 or the delay circuit 34 to input the interruption signals to CPU 11 via the signal line 36 or to the delay circuit 34 and then CPU 11. The counter 31 is given a certain count value and activates the switching circuit 33 when the value counted by the counter 31 exceeds that value. Further, the timer 32 is in advance given a time for counting by the counter 31 and a delay time for the delay circuit 34.

Figure 3:
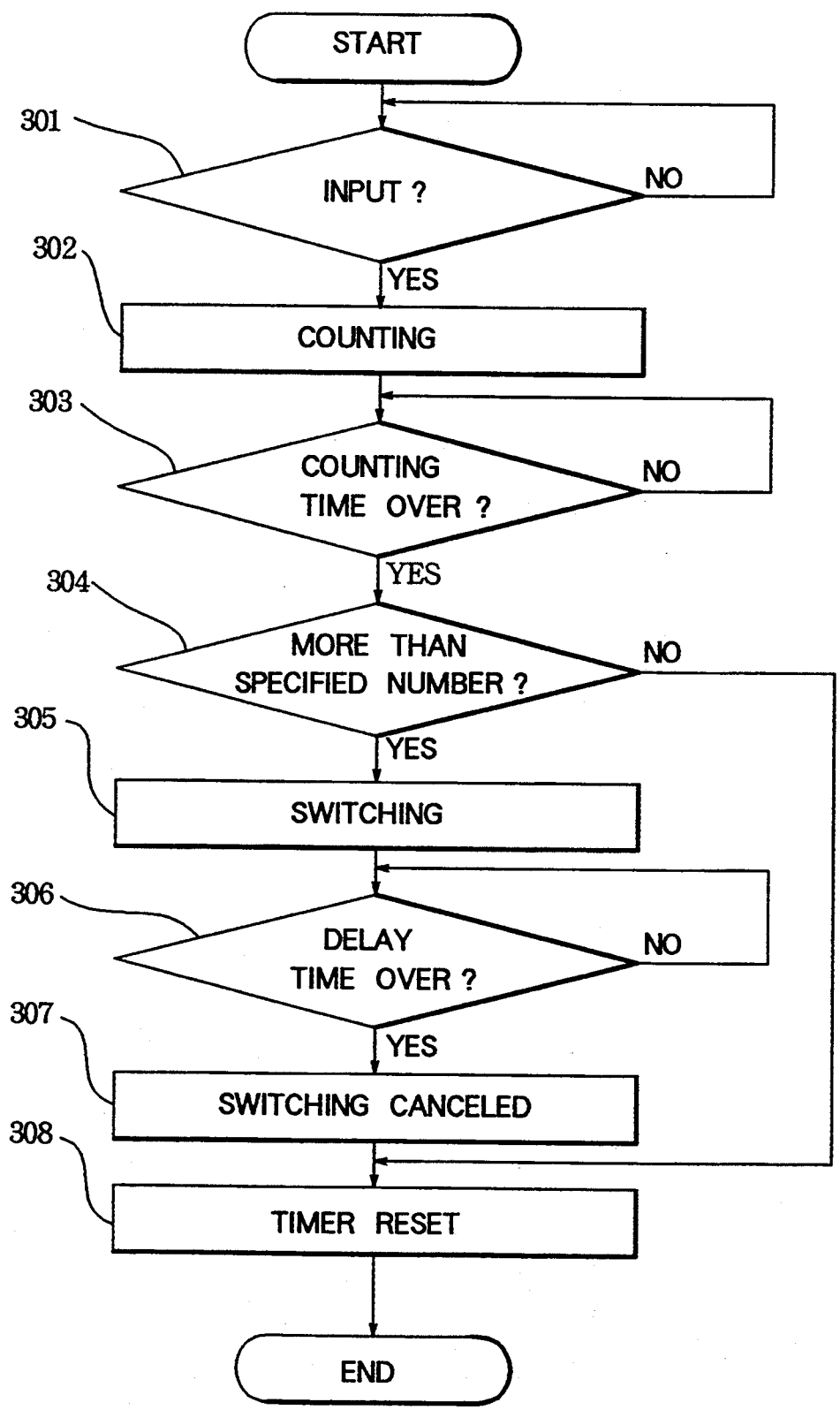
FIG. 3 is a flowchart to show operation of the interruption restriction circuit according to the embodiment.

Next, referring to the flowchart of FIG. 3 and timing charts of FIGS. 4 and 5, the operation of the multiprocessor circuit with the above configuration is described below.

Figure 4:
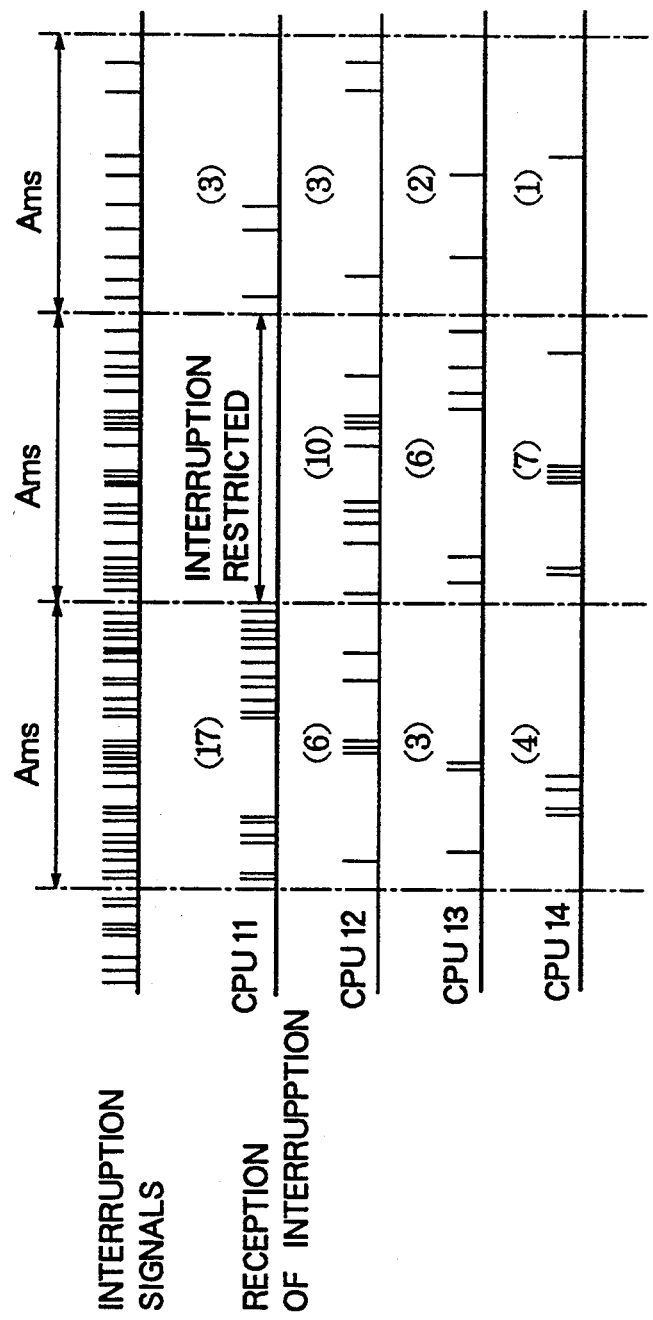
FIG. 4 is a diagram to show reception of interruption signals by each CPU in the multiprocessor circuit according to this embodiment.
Figure 5:
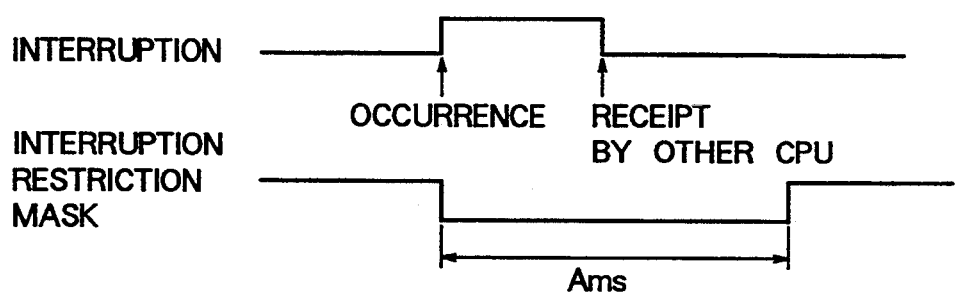
FIG. 5 is a time chart to show the operation timing of the interruption restriction circuit according to this embodiment.

Suppose here that the counter 31 of the interruption restriction circuits 21 to 24 has "16" as the count value and the timer 32 is given "A ms" as the time to be kept, and the interruption signals are input through the interruption line 1 as shown in FIG. 4. The delay time set at the delay circuit 34 is the same as the time kept by the timer 32 (A ms).

When interruption signals are input through the signal line 1 and distributed to the CPUs 11 to 14, the counter 31 at each of the interruption restriction circuits 21 to 24 recognizes the input of interruption signals (Step 301) and counts the interruption signals received by the CPUs 11 to 14 (Step 302). Then, the counter 31 judges whether the corresponding CPU has received more than 16 (predetermined value) interruption signals in a specified period of A ms (Steps 303 and 304).

If a value more than 16 is obtained from the counting above, that is, if any of the CPUs has received more than 16 interruption signals, the switching circuit 33 of the interruption restriction circuit 21, 22, 23 or 24 corresponding to that CPU switches the connection to the delay circuit 34 to activate the delay circuit 34 (Step 305). As a result, during the delay time (A ms) set at the delay circuit 34, any interruption signals are not sent to the applicable CPU. During this delay time, the interruption signals are received by other CPUs.

In FIG. 4, CPU 11 counts 17 interruption signals during the first A ms. In this case, as shown in FIG. 5, the switching circuit 33 operates at the rising of the 17th interruption signal and at the same time the delay circuit 34 is activated. This causes the interruption restriction mask to operate for delay time of A ms so as to prevent interruption signals from being received by CPU 11 and distribute the interruption signals to other CPUs 12 to 14. Figures in parentheses in FIG. 4 indicate the number of interruption signals received by the CPUs 11 to 14 in A ms.

When the delay time set at the delay circuit 34 elapses (Step 306), the switching circuit 33 cancels holding by the delay circuit 34 and switches the connection to the signal line 36 (Step 307). The counter 31 is reset (Step 308) here. If the value counted by the counter 31 does not exceed 16 in A ms at the Steps 303 and 304, the operation proceeds to Step 308, where the counter 31 of the applicable interruption restriction circuit 21 is reset.

As shown above, when the number of interruption signals received by a particular CPU exceeds a fixed value, a multiprocessor circuit of the present invention restricts the reception of interruption signals by that CPU for a certain time period, causing other CPUs to receive the interruption signals. Thus, interruption signals are distributed practically equally to a plurality of CPUs. This prevents concentration of interruption signals upon a particular CPU and, in turn, excessively long processing time at one CPU. As a result, the throughput of the whole multiprocessor circuit can be improved.

The time A ms set at the timer 32 can be changed freely. The number of interruption signals acceptable during that time can be also arbitrarily set.

Figure 6:
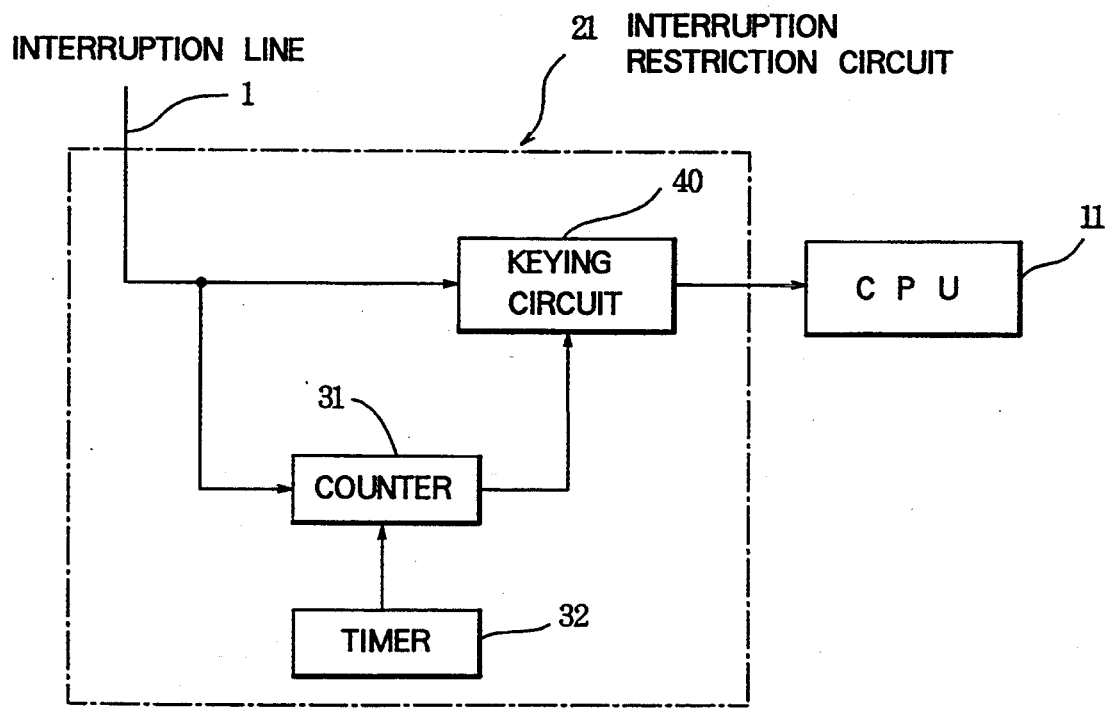
FIG. 6 is a block diagram to show the internal configuration of an interruption restriction circuit of a multiprocessor circuit according to a second embodiment of this invention.

FIG. 6 shows the configuration of the interruption restriction circuits 21 to 24 used in a multiprocessor circuit according to a second embodiment of the present invention. In this embodiment, the multiprocessor circuit is provided with a keying circuit 40 to turn on and off the input of interruption signals instead of the switching circuit 33 and the delay circuit 34 in FIG. 2. Other devices including the counter 31 and the timer 32 are the same as in the first embodiment. The keying circuit 40 is usually turned on to connect the interruption line 1 to CPUs 11 to 14. When the counter 31 counts more than the specified value, the keying circuit 40 turns off the input of interruption signals from the interruption line 1. The duration of this disabling of interruption signal input is controlled by the timer 32. When the specified disabling time passes, the keying circuit 40 turns on again. While the input of the interruption signals is disabled by the keying circuit 40, the interruption signals are received by other CPUs as in the above embodiment.

It is needless to say that various modifications can be made to the above embodiments. For example, the time set at the timer 32 and the delay time set at the delay circuit 34 are the same (A ms) in the above embodiment, but they can be different from each other. The present invention should be construed broadly within its spirit and scope as set out in the accompanying claims.

What is claimed is:

1. A multiprocessor circuit comprising:
   a plurality of CPUs connected in parallel;
   an interruption line for input of interruption signals to the CPUs; and
   respective interruption restriction circuits connected between said interruption line and each of said CPUs, to which interruption line said CPUs are connected in parallel relationship to each other so as to deliver said interrupt signals to respective CPUs; and
   each said interruption restriction circuit comprising:
   counter means for counting a number of interruption signals received by a respective CPU during a predetermined counting time;
   timer means for setting said predetermined counting time and for resetting said counter means; and
   a delay circuit which delays input of interruption signals to the respective CPU for a predetermined delay time for restricting input of the interruption signal to the respective CPU only when the number of interruption signals received by the respective CPU in said counting time has exceeded a fixed number; and
   a switching circuit responsive to said counter means for connecting said interruption line to said delay circuit and disconnecting said interruption line from said respective CPU only when the number counted by said counter means has exceeded said fixed number.

2. The multiprocessor circuit of claim 1, wherein said counting time is the same as said predetermined delay time.

3. The multiprocessor circuit of claim 1, wherein said counting time is different from said predetermined delay time.

4. A multiprocessor circuit comprising:

a plurality of CPUs;

an interruption line for input of interruption signals to the CPUs, to which interruption line said CPUs are connected in parallel relationship to each other so as to deliver said interrupt signals to respective CPUs; and respective interruption restriction circuits connected between said interruption line and each of said CPUs;

wherein each said interruption restriction circuit comprises:

counter means for counting a number of interruption signals received by a respective CPU during a predetermined counting time;

timer means for setting said predetermined counting time of said counter means; and input disabling means for disabling input of interruption signals to the respective CPU for a predetermined delay time only when the number counted by said counter means has exceeded a fixed number.

5. The multiprocessor circuit of claim 4, wherein said input disabling means comprises a delay circuit which delays input of interruption signals from the interruption line to the respective CPU for said predetermined delay time, and a switching circuit which connects said interruption line to said delay circuit only when the number counted by the counter means exceeds said fixed number.

6. The multiprocessor circuit of claim 4, wherein said input disabling means comprises a keying circuit which is responsive to said interruption signals from the interruption line and provides interruption signals to said CPU.

7. The multiprocessor circuit of claim 4, wherein said timer means is further for resetting said counter means.

8. The multiprocessor circuit of claim 4, wherein said timer means is further for controlling said input disabling means.

9. The multiprocessor circuit of claim 8, wherein said input disabling means comprises a delay circuit which delays input of interruption signals from the interruption line to the respective CPU for said predetermined delay time, and a switching circuit which connects said interruption line to said delay circuit only when the number counted by the counter means exceeds said fixed number.

10. The multiprocessor circuit of claim 9, wherein said switching circuit is responsive to said timer means.

11. The multiprocessor circuit of claim 8, wherein said input disabling means comprises a keying circuit which is responsive to said interruption signals from the interruption line and provides interruption signals to said CPU.

* * * * *